May 16, 1967

J. A. TURCOTT ETAL 3,319,562

PORTABLE GRILL EQUIPMENT

Filed June 16, 1965

INVENTORS
JOSEPH A. TURCOTT
HENRY A. TURCOTT

BY *Hauke & Hauke*

ATTORNEYS

May 16, 1967 J. A. TURCOTT ETAL 3,319,562
PORTABLE GRILL EQUIPMENT
Filed June 16, 1965 6 Sheets-Sheet 3

INVENTORS
JOSEPH A. TURCOTT
HENRY A. TURCOTT
BY Hauke & Hauke
ATTORNEYS

May 16, 1967  J. A. TURCOTT ETAL  3,319,562
PORTABLE GRILL EQUIPMENT

Filed June 16, 1965  6 Sheets-Sheet 5

INVENTORS
JOSEPH A. TURCOTT
HENRY A. TURCOTT

BY *Hauke + Hauke*
ATTORNEYS

INVENTORS
JOSEPH A. TURCOTT
HENRY A. TURCOTT

BY Hauke & Hauke
ATTORNEYS 3,319,562
PORTABLE GRILL EQUIPMENT
Joseph A. Turcott, 5581 Lodwyck, Detroit, Mich. 48224, and Henry A. Turcott, Detroit, Mich.; said Henry A. Turcott assignor to said Joseph A. Turcott
Filed June 16, 1965, Ser. No. 469,042
41 Claims. (Cl. 99—339)

This application is a continuation-in-part of our now abandoned patent application, Ser. No. 418,693, filed Dec. 16, 1964.

This invention relates to cooking grill structures, and particularly to assemblies that are adapted for barbequing and other cooking, and furthermore to an improved portable cooking grill structure in which various members of the structure serve functions both in the operating position and in the carrying position.

There are at present many different types of cooking grill and barbeque grill devices on the market, but generally these devices are either restricted in their use due to size and weight limitations, or if adapted for a variety of cooking operations and barbequing, they are generally not readily portable.

It is an object of our invention to improve cooking grill structures by providing an improved assembly which can be used for fairly large scale barbequing and cooking operations.

Another object of our invention is to facilitate transportation of larger barbequing devices by providing a structure in which substantially every element used in operation is either arranged for security in transportation or serves a function in the carrying position, so that the chance of losing parts is remote.

These and other objects of our invention will become more readily apparent in the following description, and upon reference to the accompanying drawings in which like reference characters refer to like parts throughout the several views, and in which.

Description

Figure 1:
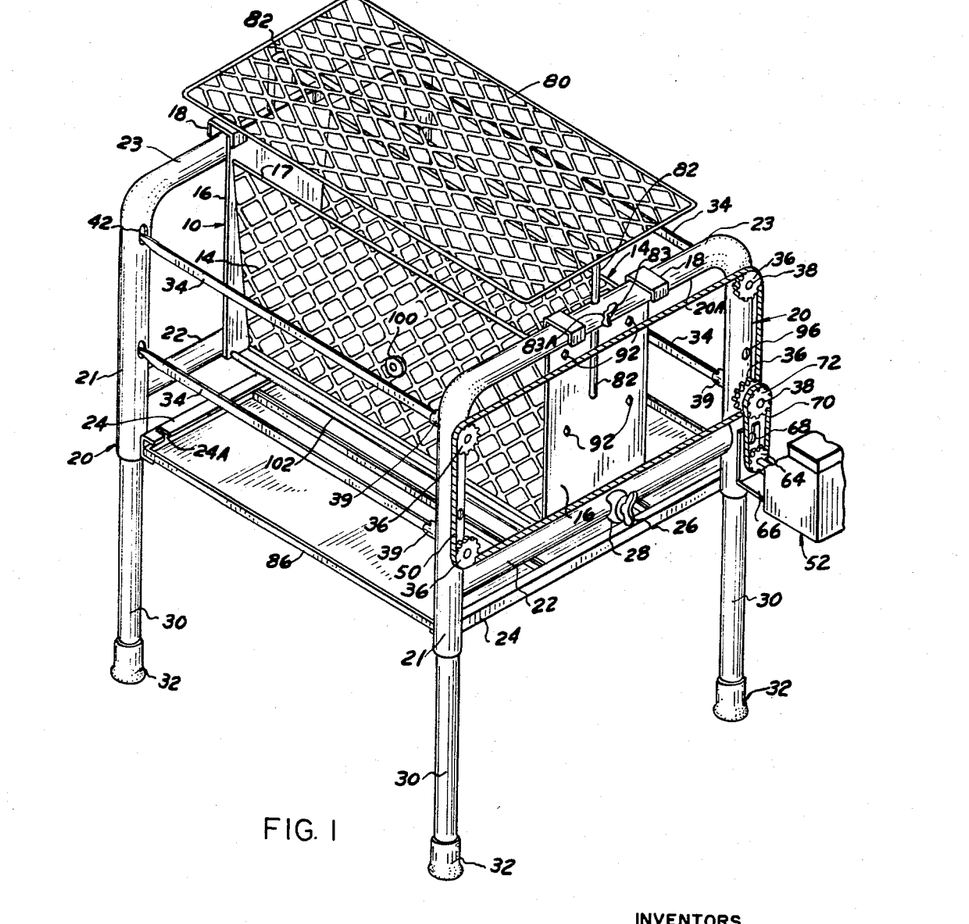
FIG. 1 is a perspective view illustrating one structure embodying our invention set up and adapted for cooking operations.
Figure 4:
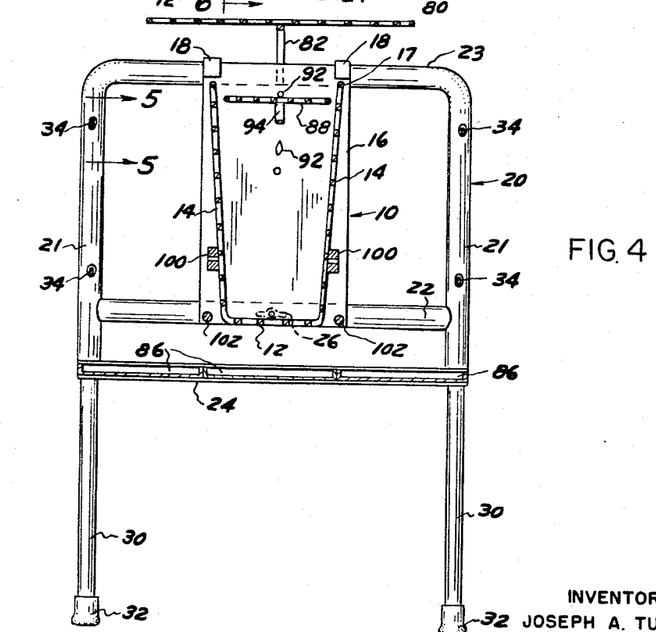
FIG. 4 is a vertical cross-sectional view through the structure as assembled for cooking operations.

As shown in FIGS. 1 and 4, the present structure when assembled in the operating position comprises a central fire basket assembly 10 having a bottom grate 12 and preferably inclined side wall grates 14, retained and supported between a pair of substantially flat metal end plates 16. The grates are preferably open mesh, such as can be made from what is termed "expanded metal" members. These are welded or otherwise secured to the end plates 16, and edged with rod 17, so that the fire basket provides a container for charcoal briquets or the like.

U-shaped brackets 18 or the like are secured to or integrally formed with the end plates 16. A pair of support frame assemblies 20 comprise preferably tubular members 21 made in an inverted U-shape with horizontal tubular braces 22 and channel braces 24. The upper portions 23 of the tubular members 21 are received in the brackets 18 as shown, and the tubular brace 22 is secured to the end plate by means of a thumb screw 26 extending through a boss 28 provided on the brace 22. Removable legs 30, preferably having rubber feet 32 are inserted into the lower open ends of the tubular members 21 to thereby raise the fire basket 10 and the support assemblies 20 when the device is operating.

Figure 5:
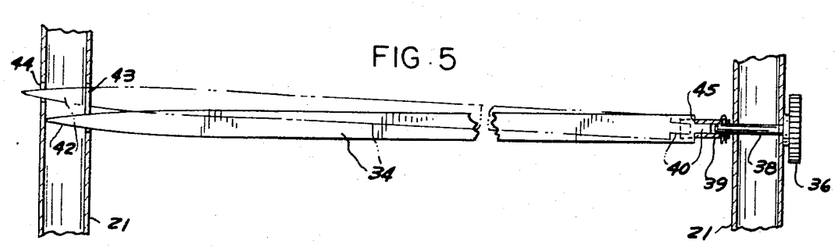
FIG. 5 is a fragmentary cross-sectional view taken substantially on the line 5—5 of FIG. 4.

The support frame assemblies 20 extend laterally outwardly of the side wall grates 14 as shown so that a set of spits 34 may be carried parallel to but spaced outwardly from the side wall grates 14. One of the support frame assemblies 20 carries thereon a set of sprocket wheels 36 mounted on shafts 38 rotatably carried on the vertical portions of the support frame members 21, and each has a socket member 39 on the side of the tube opposite to the sprocket wheel 36, as indicated in FIG. 5. The spits 34 are each provided with a pointed end as indicated at 42, and the vertical tubular portion of the other frame member 21 is provided with holes 43 to loosely receive the pointed ends 42 as indicated. The spits 34 are each inserted first through the holes 43 and through other holes 44 provided on the opposite side of the tubular frame member 21, as indicated in the dotted line position of the spit 34 shown in FIG. 5. The tang 40 is then inserted into a slot 45 of the socket member 39, drawing the spit backwardly toward the socket member 39, and the pointed ends 42 of the spit 34 will then be withdrawn from the hole 44 and dropped downwardly, since the hole 43 is vertically elongated as shown, and the spit 34 is thus retained in position because the inner wall of the tubular member 21 acts as a stop for the pointed end 42 of the spit 34.

Figure 8:
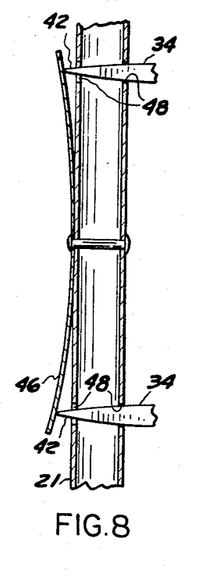
FIG. 8 is a fragmentary cross-sectional view taken substantially on the line 5—5 of FIG. 4 but illustrating a modified structure.

Alternatively, as indicated in FIG. 8 a spring member 46 may be secured as indicated on the vertical member 21 of the frame assembly 20 to engage the pointed ends 42 of two spits 34 which are merely inserted through two aligned holes 48, so that the spring 46 will urge the spits 34 toward the socket members 39.

Figure 9:
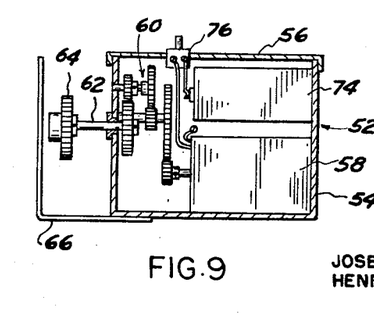
FIG. 9 is a cross-sectional view of the motor unit of the assembly.

The sprocket wheels 36 are all interconnected for simultaneous rotation by any means such as a chain 50. A motor assembly 52 is provided to drive the chain 50. The motor assembly 52 as shown in FIG. 9 preferably comprises a casing 54 having a removable top plate 56 for access to a driving motor 58 contained within the casing 54, and drivingly connected through a reduction gear assembly 60 to a drive shaft 62 extending through a side wall of the casing 54 as shown and closely adjoins the end of the shaft 62 near the drive gear 64, and is removably secured by any means such as a screw 68 shown in FIG. 1 to the vertical portion of the frame member 21 carrying the sprocket wheels 36. A drive chain 70 connects the drive gear 64 with a driven sprocket 72 secured to the shaft 38 of the adjacent sprocket wheel 36 for rotation thereof. The motor 58 is preferably of the fractional horse-power type, driven by a pair of common dry-cell batteries 74 carried within the casing 54 and electrically connected with the motor 58 through a suitable switch 76.

A grill member 80 is provided with a pair of vertically extending rod members 82 spaced for insertion into holes 84 provided in the upper horizontally extending portion 23 of the frame members 21. One of the rods 82 will preferably be locked in place at a desired height by means of a thumb screw 83 threaded into a hole 83A in the tube member 23. The grill 80 is thus adapted for cooking various food items over the top of the fire basket assembly 10.

The channel braces 24 have their open sides facing each other for the supporting retention of drip pans 86 between the two frame assemblies 20 and underneath the spits 34 and the fire basket assembly 10, as indicated in FIGS. 1 and 4. These drip pans 86 are readily removable by sliding them out the ends of the channel braces 24.

Figure 2:
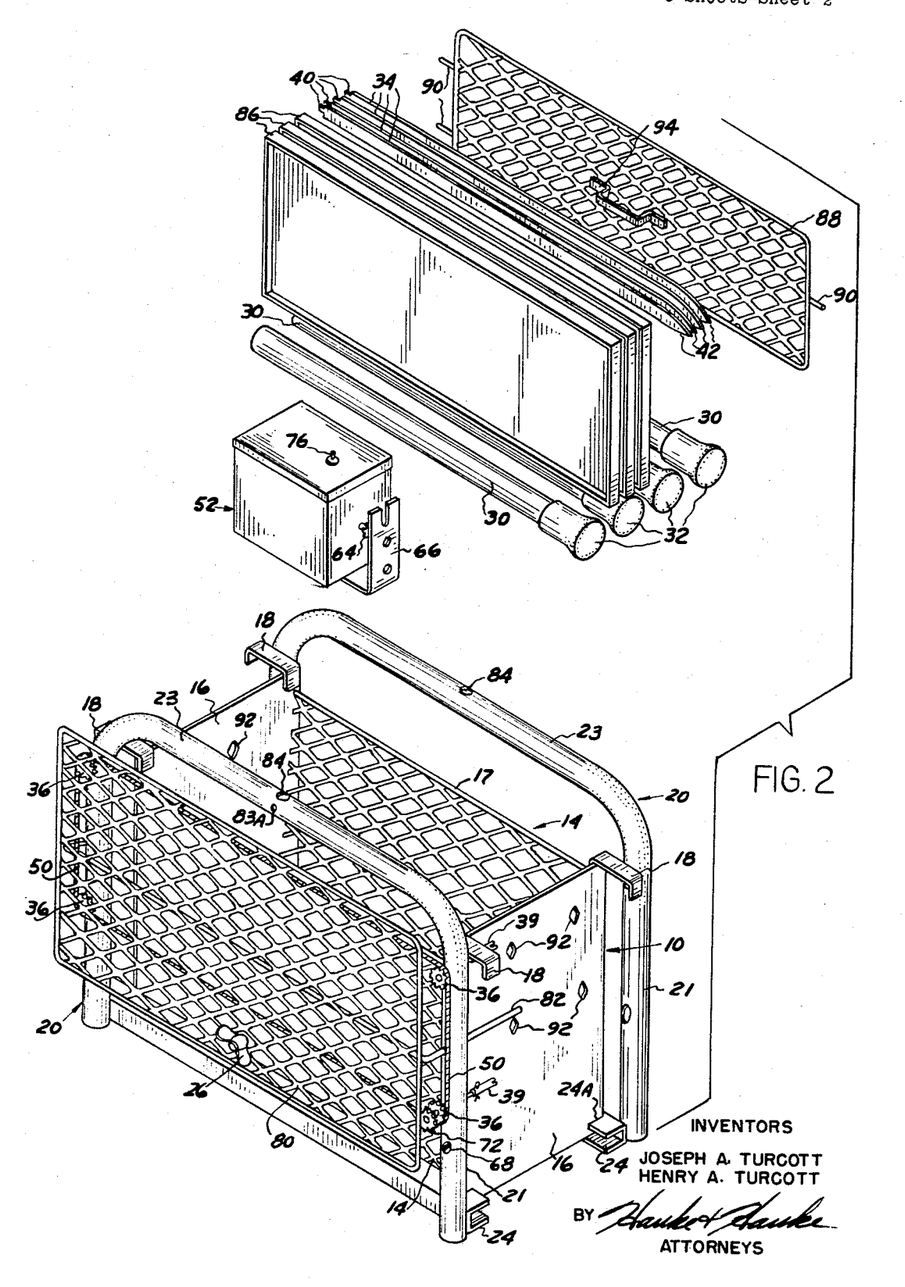
FIG. 2 is a perspective view illustrating the assembly in the carrying position with various members shown in readiness for storage within the central fire basket part of the assembly.
Figure 6:
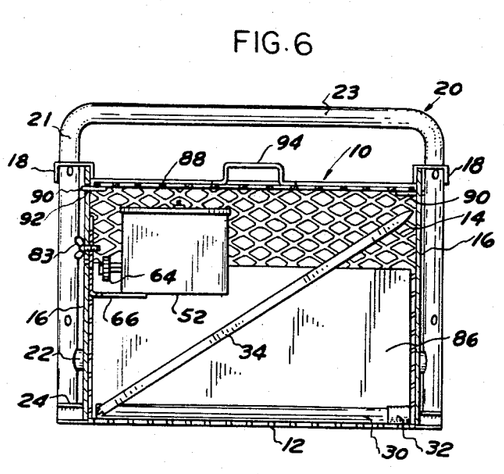
FIG. 6 is a cross-sectional view taken substantially on the line 6—6 of FIG. 3.
Figure 7:
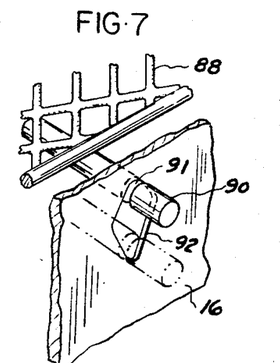
FIG. 7 is a fragmentary perspective view of a portion of the device.

As indicated in FIG. 4 a supplemental fire grate member 88 as seen in FIGS. 2, 6 and 7 has pins 90 extending from the ends of the grate 88. In operation, the pins would pass through upper or lower holes 92 provided in the end plates 16. As indicated in FIG. 7, the holes 92 are preferably vertically elongated and tapered at the upper and lower ends, and the end of the pin 90 is annularly grooved as at 91 so that it will lock into place in the hole 92 both when it is resting for operating purposes, and when it is raised for carrying, as will be explained later. The grate 88 has on one side thereof a handle 94, which when the grate is used to support briquettes at an upward position closer to the grill 80, as seen in FIG. 4, is disposed on the bottom of the grate member 88 and in the carrying position as seen in FIG. 6, will be disposed on the upper side of the grate member 88.

Figure 3:
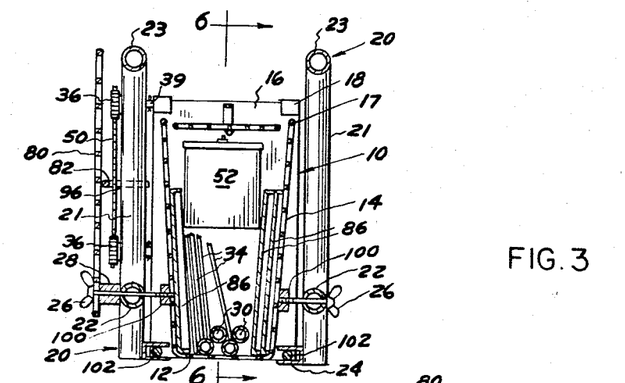
FIG. 3 is a vertical cross-sectional view through the structure of the invention as assembled in the carrying position.

When the device is disassembled and then packed together for transportation, the side support assemblies 20 will be positioned as indicated in FIGS. 2, 3 and 6 adjacent and closely overlying the side wall grates 14, and the thumb screws 26 will be secured to threaded bosses 100 provided on the side wall grates 14. The grill 80 in the carrying position is located over the sprocket wheels 36 and chain 50 for the protection thereof, and is secured in place by means of the rods 82 being inserted through holes 96 provided in the vertical portions of the frame assemblies 20 and by the thumb screw 26 on the corresponding side of the frame assembly 20. The grill 80 is retained in a secured location parallel with the chain by being clamped to the boss 28 provided on the tubular brace as seen in FIG. 3. When disassembled and packed in the carrying position, the spits 34, drip pans 86, and legs 30 will be carried within the fire basket assembly 10, in a longitudinal position so that the ends are adjacent the end plates 16, and they will not be able to escape from the fire basket. The legs 30 and drip pans 86 are dimensioned slightly shorter than the length of the fire basket, for containment thereof, and the spits 34 although necessarily somewhat longer, may still be contained within the fire basket assembly 10 by inclining them as indicated in FIG. 6. The motor assembly 52 is bolted to one of the end plates beneath the supplemental fire grate member 88 (used in the operating position to secure the grill member 80) by using the thumb screw 83 and in position to wedgingly engage the drip pans 86 which are disposed on the sides, to keep the drip pans 86 from rattling or being displaced, as seen in FIGS. 3 and 6.

The channels 24 are provided with slots 24A to engage the edges of the end plates 16 as seen in FIG. 2, and further enclose bracing rods 102 (see FIGS. 1 and 4) secured between the end plates 16, as indicated in FIG. 3. Thus the channels 24 provide a substantial base for the packed assembly as well as giving additional support for the fire basket 10.

It will be seen that the only unattached parts of the assembly in the carrying position are the legs 30, spits 34 and drip pans 86, all of which, however, are retained and enclosed to prevent loss. The frame assemblies 20, grill 80, motor assembly 52, and grate 88, as well as the various thumb screws described, all have dual functions, serving one purpose in operation and another in storage or carrying position.

Figures 10, 13:
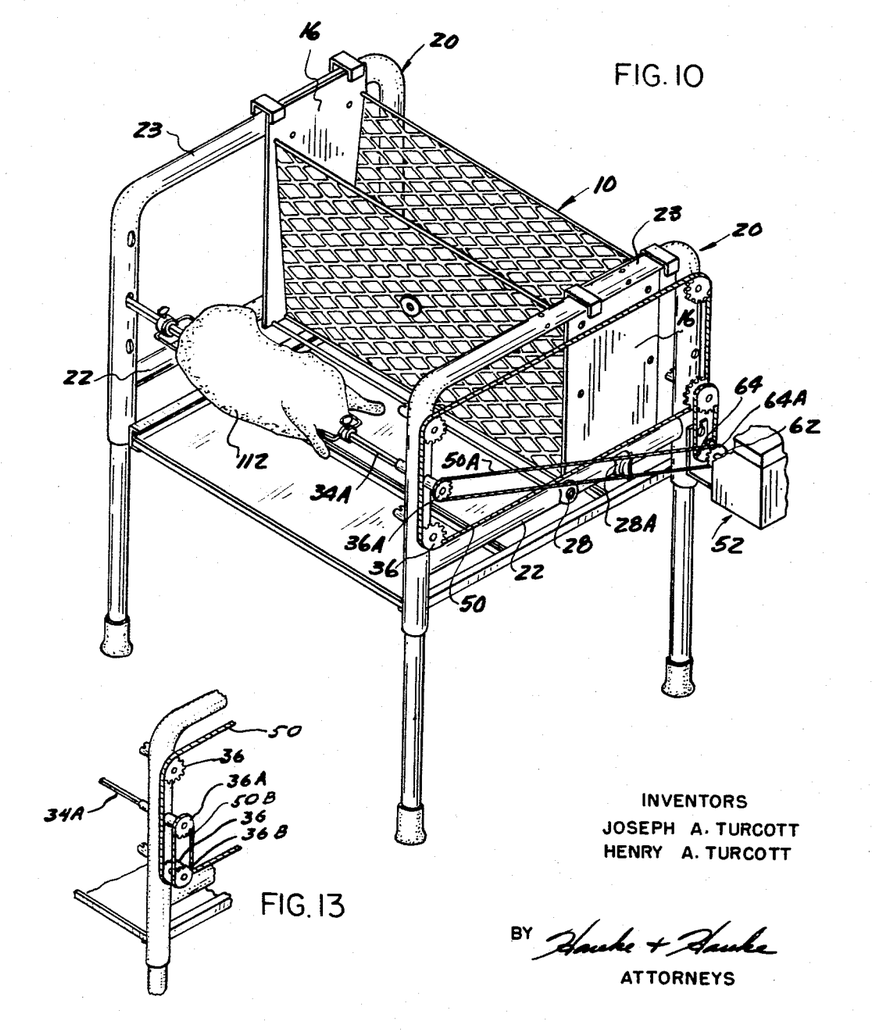
FIG. 10 is a perspective view illustrating a modification of the invention as assembled and adapted for added operation.
FIG. 13 is a fragmentary perspective view illustrating another modification of the invention.

In the assembly shown in FIG. 10, additional features have been added to the basic structure of FIG. 1 to make the device even more versatile.

As shown, the assembly comprises the previously described components of the fire basket assembly 10 having end plates 16, the support frame assemblies 20 having upper portions 23 and braces 22. However, second thumb screw bosses 28A are provided on the braces 22 offset so that the fire basket assembly 10 may be assembled in the off-center position shown.

The drive motor shaft 62 has a second drive gear 64A which drives an auxiliary sprocket wheel 36A through a second chain 50A, the sprocket 36A being carried on the frame assembly 20 intermediate the sprockets 36.

Figure 11:
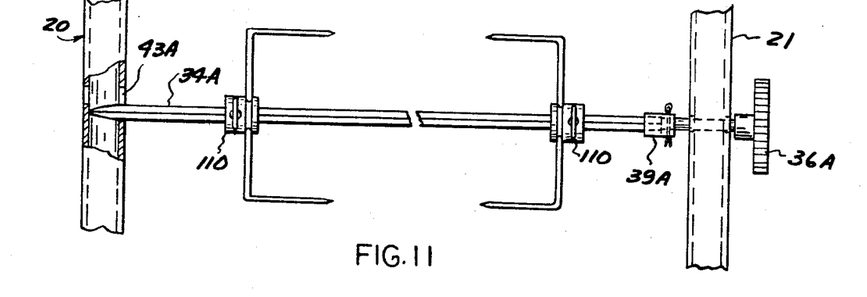
FIG. 11 is a fragmentary elevational view of a spit assembly for use with the modification of FIG. 10.

A spit 34A of preferably square cross-section is removably supported and engaged at one end in the sprocket shaft collar 39A as seen in FIG. 11, and at the other end in an elongated hole 43A provided in the opposite frame assembly 20. The spit 34A slidably supports fork-carrying collars 110 such that a large item 112 to be cooked may be carried and clamped on the spit 34A at the desired position adjacent the fire basket 10 which is off-center to accommodate it.

Figure 12:
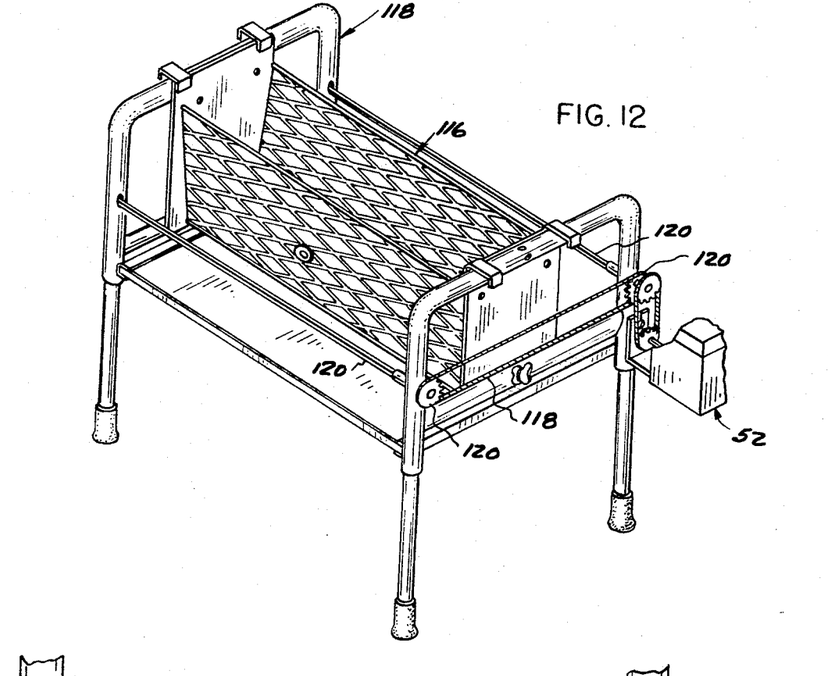
FIG. 12 is a perspective view illustrating a further modification of the invention assembled and adapted for operation.

The modification of FIG. 12 is a smaller unit than the ones heretofore described, but comprises similar, if fewer, components.

As shown, a shallower fire basket assembly 116 is carried between two shorter frame assemblies 118 which accommodate only two spits 120, one on each side of the basket 116; driven from the motor 52 through a shorter drive chain 118 and sprockets 120. Otherwise, this device is substantially the same in function and construction as those of FIGS. 1 and 10.

FIG. 13 illustrates another method of driving the spit 34A used in the structure of FIG. 10, in this case there being a second sprocket 36B on one of the closer sprockets 36 and a short drive chain 50B from the sprocket 36B to the sprocket 36A, thus eliminating the need for such a long drive chain 50A of FIG. 10. In both FIGS. 10 and 13, the full power of the motor is transmitted to the single spit 34A for turning large items.

Although we have described and shown only one embodiment of our invention, it will be apparent to one skilled in the art to which the invention pertains that various changes and modifications may be made therein without departing from the spirit of the invention or the scope of the appended claims.

We claim:
1. A cooking grill assembly comprising,
  (a) a fire basket for containing charcoal and the like and having a bottom grate, a pair of spaced side members and a pair of spaced end members,
  (b) said end members being spaced farther apart than said side members,
  (c) a pair of inverted U-shaped support frame structures and means for selectively removably securing said frame structures to said end members in an operating position to provide support for said fire basket and means for selectively removably securing said frame structures to said side members in a carrying position to provide a more compact package for carrying.

2. The assembly as defined in claim 1 and in which said frame structures have means cooperating when in the operating position to rotatably support at least one spit member in a position substantially parallel to a side member of said fire basket structure.

3. The assembly as defined in claim 2 and in which one of said frame structures has means operatively engaging and rotating said spit member when in the operating position.

4. The assembly as defined in claim 1 and in which said frame structures have means cooperating when in the operating position to rotatably support at least one spit member in a position exteriorly spaced from and substantially parallel to each side member of said fire basket structure.

5. The assembly as defined in claim 4 and in which
 (a) one of said frame structures has a driving means operatively engaging said spit member,
 (b) means carried by and operatively connecting said driving means, and
 (c) motor means carried by said one of said frame structures and drivingly connected with said driving means.

6. A cooking grill assembly comprising,
 (a) a fire basket for containing charcoal and the like having a bottom grate, a pair of spaced side members and a pair of spaced end members,
 (b) a pair of support frame structures selectively removably secured in an operating position to said end members and in a carrying position to said side members,
 (c) said frame structures having means cooperating when in the operating position to rotatably support at least one spit member in a position exteriorly spaced from and substantially parallel to one of said side members of said fire basket, and
 (d) one of said frame structures having a driving means operatively engaging said spit member,
 (e) means carried by and operatively connecting said driving means,
 (f) motor means carried by said one of said frame structures and drivingly connected with said driving means, and
 (g) said driving means comprising a shaft rotatably carried by said one of said frame structures and provided with means for removably engaging an end of said spit member and a gear secured to said shaft.

7. The assembly as defined in claim 6 and in which said means connecting said driving means comprises a chain or the like interconnecting all of said gears for transmitting rotation therebetween.

8. The assembly as defined in claim 7 and in which said motor means has means removably drivingly connected with one of said shafts.

9. A cooking grill assembly comprising,
 (a) a fire basket for containing charcoal and the like having a bottom grate, a pair of spaced side members and a pair of spaced end members,
 (b) a pair of support frame structures selectively removably secured in an operating position to said end members and in a carrying position to said side members,
 (c) said frame structures having means cooperating when in the operating position to rotatably support at least one spit member in a position exteriorly spaced from and substantially parallel to one of said side members of said fire basket,
 (d) said spit member comprising an elongated skewer having a tapering point at one end and a tang at the other end,
 (e) one of said frame structures having a hole therein for receiving and rotatably supporting the point end of said skewer, and
 (f) a driving shaft rotatably carried by the other frame structure and having a socket removably receiving and engaging the tang end of said skewer.

10. The assembly as defined in claim 9 and in which the first mentioned frame structure has means restricting axial movement of said skewer out of engagement with the driving shaft of the other frame structure.

11. The assembly as defined in claim 10 and in which said last mentioned means comprises a stop member resiliently engaging the point end of said skewer and urging same toward said socket.

12. The assembly as defined in claim 9 and in which
 (a) the first mentioned frame structure includes a tubular portion provided with holes in opposite sides for receiving the pointed end of said skewer, and
 (b) the hole in one side being vertically elongated and extending downwardly with respect to the hole in the other side,
 (c) whereby the pointed end of the skewer may be inserted through both holes and the tang end may then be inserted into the socket of the shaft carried by the other frame structure, whereupon the pointed end is withdrawn from only the higher located hole and will drop down so that the inner surface of the tubular portion acts as a stop to prevent displacement of the tang from the socket.

13. A cooking grill assembly comprising,
 (a) a fire basket having a bottom grate member, side members and end members extending upwardly from the bottom grate member to form an open top container for charcoal and the like,
 (b) a frame structure secured to each end member and extending outwardly from the side members in planes substantially parallel with the end members,
 (c) said frame structures having supporting legs having means cooperating to rotatably support at least one spit member outwardly spaced from and parallel to one of said side members,
 (d) motor means carried by one of said frame structures,
 (e) means drivingly connecting said motor means to said spit, and
 (f) said motor means comprising a casing having an electric motor, reduction gearing, and a power supply electrically connected with said motor.

14. A cooking grill assembly comprising,
 (a) a fire basket having a bottom member, side members and end members extending upwardly from the bottom member to form an open top container for charcoal and the like,
 (b) a frame structure secured to each end member and extending outwardly from the side members in planes substantially parallel with the end members,
 (c) said frame structures have means cooperating to rotatably support at least one spit member outwardly spaced from and parallel to one of said side members,
 (d) motor means carried by one of said frame structures, and
 (e) means drivingly connecting said motor means to said spit member,
 (f) said spit member comprising an elongated skewer having a tapered point at one end and a tang at the other end,
 (g) one of said frame structures having a hole therein for receiving and rotatably supporting the point end of said skewer, and
 (h) a driving shaft rotatably carried by the other frame structure and having a socket removably receiving and engaging the tang end of said skewer.

15. The assembly as defined in claim 14 and in which the first mentioned frame structure has means restricting axial movement of said skewer out of engagement with the driving shaft of the other frame structure.

16. The assembly as defined in claim 1 and including a grill member removably carried by at least one of said frame structures when in said operating position overlying the top of said fire basket.

17. The assembly as defined in claim 16 and in which one of said frame structures has means carrying said grill member in a position adjacent a side member of said fire basket when in said carrying position.

18. The assembly as defined in claim 16 and in which said assembly has a grate member selectively removable and selectively carried by and within said fire basket in a plane parallel with said grill member and at selectively alternative dimensions from said grill member.

19. The assembly as defined in claim 18 and including means selectively locking said grate member in and to said fire basket.

20. The assembly as defined in claim 19 and in which said grate member has a carrying handle and is selectively inverted in said fire basket whereby in the operating position said handle may be positioned downwardly and in the carrying position said handle may be positioned upwardly.

21. A cooking grill assembly comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) at least one spit member selectively carried by said frame members in the operating position and spaced from and parallel with a side member,
(d) a motor assembly for driving said spit member, and
(e) means selectively securing said motor assembly to one of said frame structures exteriorly of the fire basket when in the operating position and selectively securing said motor assembly to said fire basket interiorly thereof when in the carrying position.

22. The assembly as defined in claim 21 and in which,
(a) said assembly includes at least one drip pan,
(b) said frame members have means selectively carrying said drip pan beneath said spit member when in the operating position, and
(c) said drip pan is dimensioned to fit within said fire basket when in the carrying position.

23. The assembly as defined in claim 22 and in which said motor assembly when secured to said fire basket in the carrying position is located to engagingly retain said drip pan within said fire basket.

24. A cooking grill comprising,
(a) a fire basket for containing charcoal and the like and having a bottom grate, a pair of spaced side members and a pair of spaced end members,
(b) a pair of support frame structures each of a substantially U-shaped construction and secured in an inverted position to said end members for supporting said fire basket intermediate said support frame structures,
(c) said side members comprising open mesh grates, and
(d) said frame structures having means selectively removably rotatably carrying at least one spit member spaced from and parallel to each of said side member grates below the upper edge of said grates when in the operating position.

25. The assembly as defined in claim 24 and in which one of said frame members has means selectively simultaneously driving said spit member.

26. A cooking grill assembly comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) said assembly including a set of legs,
(d) said frame structures having means selectively removably engaged with said legs when in the operating position, and
(e) said legs when engaged with the frame structures extending downwardly with respect to the fire basket to elevate same and provide air space beneath said bottom grate.

27. The assembly as defined in claim 26 and in which said legs are each dimensioned less than the greatest internal linear dimension of said fire basket whereby said legs may be contained within the fire basket when in the carrying position.

28. A cooking grill assembly comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) said end members each comprising a substantially vertically disposed plate,
(d) said side members extending between said end plates and supporting same in spaced parallel relation,
(e) bracing rod members extending between said end plates on opposite sides of the fire basket exteriorly thereof,
(f) said frame structures each having a pair of vertically spaced parallel horizontally extending lateral bars, and
(g) means engaging one bar of each frame structure with a bracing rod and means receiving the other bar of each frame structure to a side member when the assembly is in the carrying position.

29. The assembly as defined in claim 28 and in which
(a) said assembly includes at least one drip pan, and
(b) a bar of each frame structure has means removably supporting said drip pan when the assembly is in the operating position, the bars engaging opposite ends of said drip pan to support same in a plane spaced from and at a lower level than the bottom grate of said fire basket.

30. A cooking grill assembly comprising,
(a) a fire basket for containing charcoal and the like and having a bottom grate, a pair of spaced side members and a pair of spaced end members,
(b) a pair of support frame structures selectively removably secured in an operating position to said end members and in a carrying position to said side members, and
(c) said support frame structures having means cooperating when in the operating position to selectively rotatably support any or all of a plurality of spit members in positions substantially parallel to a side member of said fire basket structure.

31. A cooking grill assembly comprising,
(a) a fire basket for containing charcoal and the like and having a bottom grate, a pair of spaced side members and a pair of spaced end members,
(b) a pair of support frame structures selectively removably secured in an operating position to said end members and in a carrying position to said side members,
(c) said support frame structures having means cooperating when in the operating position to selectively rotatably support any or all of a plurality of spit members in positions substantially parallel to a side member of said fire basket structure, and (d) a plurality of rotatably driven members supported by said frame structures, (e) a spit member selectively engageable with each driven member, and (f) means simultaneously rotating all of said driven members.

32. The assembly as defined in claim 31 and having second driving means drivingly connecting one of said driven members with another of said driven members.

33. A cooking grill comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) said frame structures having means cooperating when in the operating position to rotatably support at least one spit member in a position exteriorly spaced from and substantially parallel to one of said side members of said fire basket, and
(d) one of said frame structures having a driving means operatively engaging said spit member,
(e) means carried by and operatively connecting said driving means,
(f) motor means carried by said one of said frame structures and drivingly connected with said driving means, and
(g) said motor means comprising a casing having means removably securing same to said one of said frame structures, an electric motor carried by said casing and having a drive shaft removably drivingly connected with said driving means, and a power supply carried by said casing and electrically connected with said motor.

34. The assembly as defined in claim 33 and in which said casing encloses said motor and power supply and has a removable cover to provide access to said motor and power supply.

35. A cooking grill assembly comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) said frame structures having means cooperating when in the operating position to rotatably support at least one spit member in a position substantially parallel to a side member of said fire basket,
(d) said frame structures having means operatively engaging and rotating said spit member when in the operating position,
(e) a grill member removably carried by at least one of said frame structures when in said operating position overlying the top of said fire basket,
(f) one of said frame structures having means carrying said grill member in a position adjacent and spaced from one of said side members of said fire basket when in said carrying position, and
(g) said means engaging and rotating said spit member being disposed intermediate said grill member and said adjacent side member when in the carrying position whereby said last named means is protected by said grill member from damage while said assembly is in the carrying position.

36. A cooking grill assembly comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) said side members comprising open mesh grates,
(d) said frame structure having means selectively removably rotatably carrying at least one spit member spaced from and parallel to one of said side member grates when in the operating position,
(e) a reflective pan of a dimension to fit within said fire basket and arranged to lie flat against either of said side member grates for selectively reflecting and directing heat toward the other of said side member grates.

37. A cooking grill assembly comprising,
(a) a fire basket for containing charcoal and the like having a bottom grate, a pair of spaced side members and a pair of spaced end members,
(b) a pair of support frame structures selectively removably secured in an operating position to said end members and in a carrying position to said side members,
(c) said end members each comprising a substantially vertically disposed plate having an inverted U-shaped bracket extending outwardly from the plane of said plate,
(d) said frame structures each having a pair of vertically spaced parallel horizontally extending lateral bars,
(e) means removably securing one of said bars to said plate when the other bar is engaged in said U-shaped bracket when the assembly is in the operating position.

38. A cooking grill assembly comprising,
(a) a fire basket for containing charcoal and the like and having a bottom grate, a pair of spaced side members and a pair of spaced end members,
(b) a pair of support frame structures selectively removably secured in an operating position to said end members and in a carrying position to said side members,
(c) said support frame structures having means cooperating when in the operating position to selectively rotatably support any or all of a plurality of spit members in positions substantially parallel to a side member of said fire basket structure, and
(d) means selectively supporting said fire basket structure by said frame structures centrally intermediate said spit members or closer to one side than the other side of said frame structures, whereby one spit member may be located at selectively different distances relative to said fire basket.

39. A cooking grill assembly comprising,
(a) a fire basket for containing charcoal and the like and having a bottom grate, a pair of spaced side members and a pair of spaced end members,
(b) a pair of support frame structures selectively removably secured in an operating position to said end members and in a carrying position to said side members,
(c) said support frame structures having means cooperating when in the operating position to selectively rotatably support any or all of a plurality of spit members in positions substantially parallel to a side member of said fire basket structure, and
(d) means simultaneously rotating all of said spit members.

40. A cooking grill comprising,
(a) a fire basket for containing charcoal and the like and having a bottom grate, a pair of spaced side members and a pair of spaced end members,
(b) a pair of support frame structures each of a substantially U-shaped construction and secured in an inverted position to said end members for supporting said fire basket intermediate said support frame structures, (c) said frame structures having means to rotatably support at least one spit member in a position substantially parallel to the side members of said fire basket structure and below the upper edges of said side member.

41. A cooking grill comprising,
(a) a fire basket for containing charcoal and the like and having a bottom grate, a pair of spaced side members and a pair of spaced end members,
(b) a pair of support frame structures each of a substantially U-shaped construction and secured in an inverted position to said end members for supporting said fire basket intermediate said support frame structures,
(c) said side members comprising open mesh grates,
(d) said frame structures having means selectively removably rotatably carrying at least one spit element spaced from and parallel to each of said side member grates and below the upper edge of said side member when in the operating position.

References Cited by the Examiner
UNITED STATES PATENTS

| | | | |
|---|---|---|---|
| 1,554,645 | 9/1925 | Morris | 99—421 |
| 2,511,594 | 6/1950 | Loffredo | 99—421 |
| 2,600,234 | 6/1952 | Foley | 99—421 |
| 2,734,499 | 2/1956 | Lombardi | 99—419 |
| 3,103,161 | 9/1963 | Whitehead | 99—421 |

WALTER A. SCHEEL, *Primary Examiner.*
ROBERT W. JENKINS, *Examiner.*